UNITED STATES PATENT OFFICE.

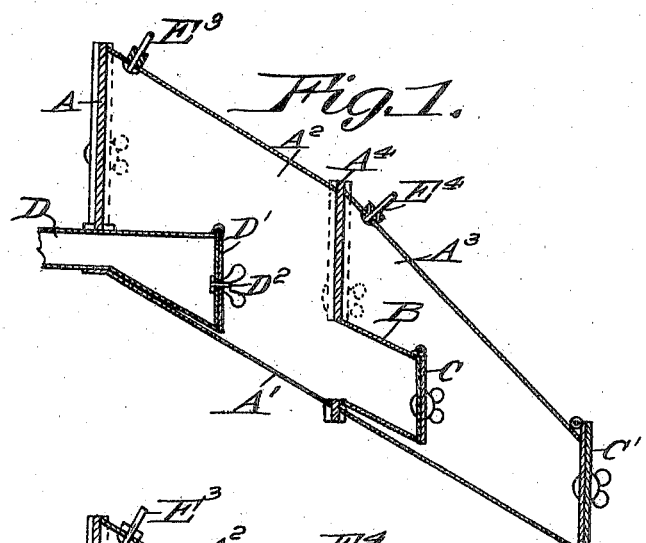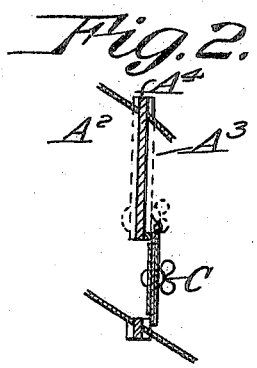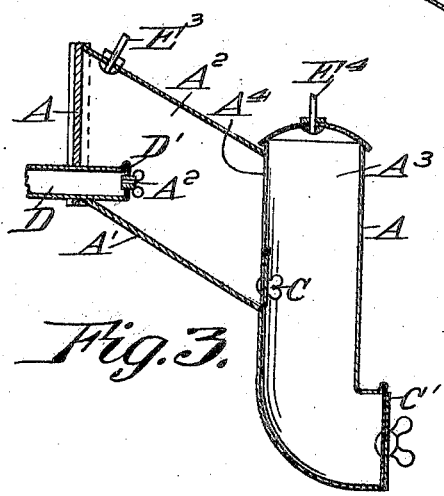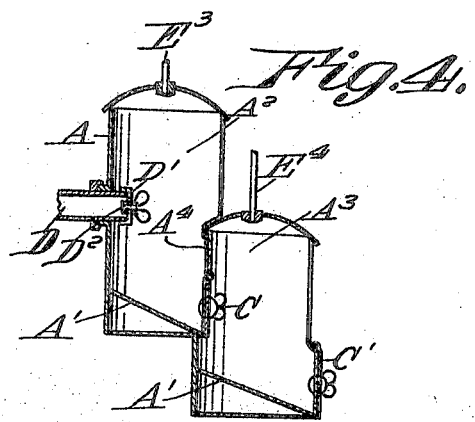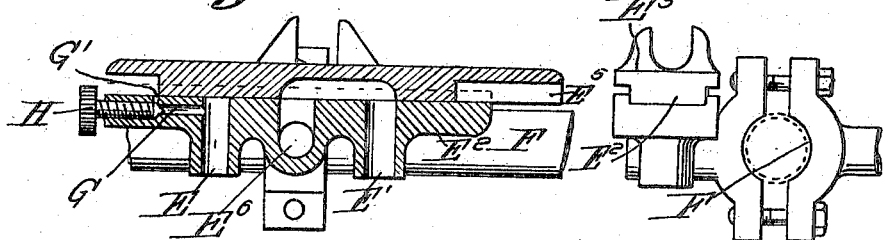

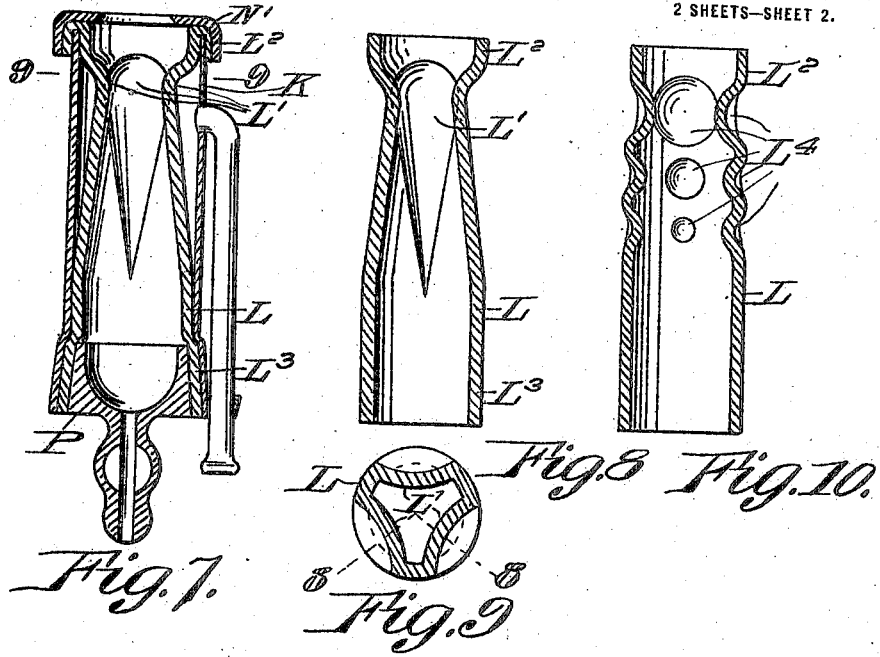
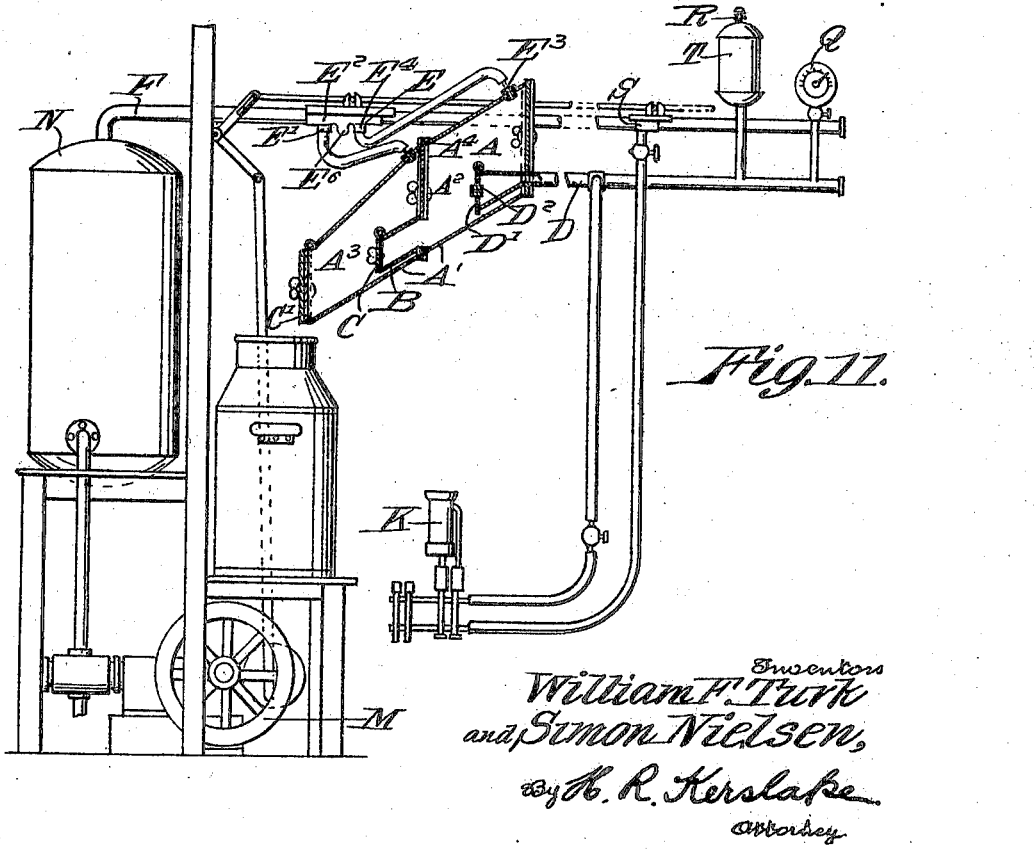

WILLIAM FREDERICK TURK AND SIMON NIELSEN, OF BRISBANE, QUEENSLAND, AUSTRALIA.

MILKING MACHINE.

1,417,116.  Specification of Letters Patent. Patented May 23, 1922.

Application filed October 21, 1920. Serial No. 418,501.

*To all whom it may concern:*

Be it known that we, WILLIAM FREDERICK TURK and SIMON NIELSEN, subjects of the King of Great Britain, residing at Brisbane, in the State of Queensland, Commonwealth of Australia, have invented certain new and useful Improvements in or Relating to Milking Machines, of which the following is a specification.

This invention relates to milking machines, the object being to provide an improved releaser, an improved pulsator for operating same, and an improved teat cup for use in connection therewith. The arrangement and operation of the releaser and pulsator is such that a more complete and quicker removal of the milk therefrom is obtained, while the milk and spray is entirely prevented from entering the vacuum system and tank, thus ensuring a much cleaner arrangement, free from contamination. The arrangement and operation of the teat cup is such that a better and more natural action is obtained as compared with other teat cups, and when used in conjunction with the releaser and pulsator, to which reference has been made, a milking plant is produced which is a great improvement on other plants.

In carrying out this invention we provide a vessel of suitable shape and material with a sloping bottom and divided by a partition into two (receiver and ejector) compartments, hereinafter referred to respectively as the receiver, and ejector. A non return flap valve is fitted in the lower portion of the partition so that communication may be made at certain times between the receiver and ejector. A non return flap valve is also fitted on the outside of the ejector. A milk pipe from the milking system leads into the receiver, the outlet from such milk pipe being fitted with a non return flap valve. Each of the compartments is connected by pipes with the ports of a pulsator or slide valve arranged on the vacuum pipe. This pulsator or slide valve is arranged and operated so that air is alternately admitted and withdrawn from both receiver and ejector, when air is being admitted to one compartment it is withdrawn from the other compartment and vice versa, a controlling valve being fitted in the air port of the pulsator or slide valve leading to the receiver so that a controllable quantity of air is admitted to such receiver. An air vent is provided in the flap valve fitted on the milk pipe leading into the receiver, means being provided so that the quantity of air passing through same may be regulated. This air vent may be omitted, if desired, in some cases.

We may, in some cases, provide a subsidiary vacuum chamber on the milk pipe.

The teat cup is made somewhat in the same manner as at present, but we use an improved lining or inflator. This lining is of rubber or other suitable material or materials of uniform thickness, and has a number of indentations (preferably three) deeper and wider at the top or open end of the teat cup and tapering to a point at the lower end, being somewhat in the form of an inverted half cone. As an alternative, we may provide a number of series of indentations. These indentations would be semispherical or other desired shape and decreasing in size and depth from the top to the bottom of the lining.

In order that our invention may be better understood we will now describe it with the aid of the accompanying drawings, in which—

Fig. 1 is a side sectional elevation of our releaser.

Fig. 2 is a detail showing an alternative arrangement of valve.

Figs. 3 and 4 are side sectional elevations of alternative forms of releasers.

Fig. 5 is a side sectional elevation of our pulsator to an enlarged scale.

Fig. 6 is an end elevation of same.

Fig. 7 is a sectional elevation of our teat cup.

Fig. 8 is a sectional elevation of the lining (removed from the case) on line 8—8, Fig. 9.

Fig. 9 is a sectional plan of same, on line 9—9, Fig. 7.

Fig. 10 is a sectional elevation of an alternative form of lining.

Fig. 11 is a general arrangement of a milk plant embodying our invention.

In carrying out this invention we provide a vessel A of suitable shape and material and having a sloping bottom A¹. The vessel A is divided into two compartments, a receiver A² and ejector A³, by a partition A⁴. We do not bind ourselves to any particular shape of vessel; three shapes are shown in the drawings, of which we prefer that shown in Fig. 1. In this case the two parts A² A³ are joined together, the partition A⁴ being interposed between them, by bolts and nuts, or so that they can be readily taken apart for cleaning. In Fig. 3 the part A² is arranged diagonally as in Fig. 1 and the part A³ is vertical, the partition A⁴ being interposed between them where they are joined together. In Fig. 4 the two parts A² A³ are vertical, the partition A⁴ being placed as in Figs. 1, 2 and 3. At the bottom of the partition A⁴ or at the end of a spout B leading from the receiver A² to the ejector A³ is a flap valve C. A flap valve C¹ is also fitted on the outlet of the ejector A³. The milk pipe D from the milk system leads into the receiver A², a flap valve D¹ being fitted on the outlet of such pipe D. This valve D¹ is, generally speaking, provided with an air vent D², which may be adjustable or of a predetermined area so that the amount of air which passes through it may be controlled. There may be certain times when the vent may be closed.

Each compartment A² A³ is connected respectively to the receiver and ejector ports E E¹ of the pulsator or slide valve E² by the pipes E³ E⁴. This pulsator E² is fitted with a slide E⁵ operated from a convenient source of power supply. The vacuum port E⁶ leads from the pulsator to the vacuum pipe F, on which it is clamped or otherwise secured. The slide E⁵ is formed so that communication may be made alternately between the receiver port E and vacuum port E⁶ and ejector port E¹ and vacuum port E⁶, and also so that the ports E E¹ may be intermittently opened to air. The air passage G, which leads from the receiver port E to the port G¹, may be fitted with an adjustable pin or other valve H or it may be of an area as found most suitable, thus rendering the valve H unnecessary, the passage of air being controlled either by the valve H or area of passage G and port G¹ when such valve H is not fitted.

The teat cup casing K is similar to those at present in use. The lining or inflator L is made of rubber or other suitable material or materials of uniform thickness and may be reinforced or not as desired. It is formed with a number of indentations L¹ (preferably three) deeper and wider at the top or open end L² and tapering to a point towards the lower end L³, being somewhat in the form of an inverted half cone hemi semispherical at the upper end. We may provide, in lieu of the grooves L¹, a number of series of indentations L⁴ of semispherical or other desired shape, decreasing in size and depth from the top L² towards the bottom L³ of the lining or inflator L.

The lining C is secured in the casing A at the top by the mouth piece N' and at the bottom by the outlet piece P.

In carrying out our invention we may vary the constructional details which do not affect the essential features of our invention. The usual vacuum pumps M, reservoir N, milk pipe D, vacuum pipe F, vacuum gauge Q, safety valve R, and pulsator S, for operating the lining L of the teat cup K would be provided.

We may also fit a vacuum chamber T in the milk pipe D. The operation of our invention is somewhat the same as milking appliances at present in use, but it will be seen that the vacuum in the receiver A² is at certain times entirely cut off, a controllable quantity of air being admitted not only into the receiver A² but also, in some cases, to within the lining L of the teat cup K. With the slide E⁵ of the special pulsator E² in the position shown in Fig. 5, the ejector A³ is in communication through the ports E⁶, E¹, and pipe E⁴ with the vacuum pipe F. With ordinary systems the receiver A² would also be connected to the vacuum pipe F, the result being that while the atmosphere would keep the valve C¹ closed, and owing to there being vacuum on both sides of the valve C, the weight of milk in the receiver A² would open the valve C and allow it to flow into the ejector A³. According to this invention a controllable quantity of air is admitted through the passage G through the port E and pipe E³ into the receiver A² to assist in discharging the milk therefrom into the ejector A³, and also to prevent any milk or spray getting into the vacuum system F or reservoir N. A controllable quantity of air may be admitted through the vent D² and valve (not shown) in the flap valve D¹ to the milk pipe D and thence to the inside of the lining L of the teat cup K, thus assisting the action of the vacuum on the outside of the lining L. The air admitted to the receiver A² and milk pipe D is such that it does not unduly break down the vacuum therein. In some cases the air may be prevented from entering the milk pipe D.

On the valve E⁵ of the pulsator E² being moved over, the ejector A³ opens to the atmosphere through the pipe E⁴ and port E¹, and the pressure in the ejector A³, being equalized with that outside, the valve C¹ opens by the pressure of the milk, which may then flow out. The receiver A² through the pipe E³ and ports E E⁶ then communicate with the vacuum pipe F, and the milk is caused to flow from the milk pipe D through the valve D¹ into the receiver A², the valve C being prevented from opening by the air pressure in the ejector A³. Although, generally speaking, we prefer to use a separate pulsator S for operating the teat cup K, the area between the lining L and casing may be connected to the port E of the special pulsator E².

Owing to the formation of the lining L of the operation of the pulsator hereinbefore described and referred to, a better and more natural action is obtained. The air pressure is exerted on the outside of the lining L, first at the upper end of the teat cup on the root of the teat and then towards the lower end of the teat cup. And, furthermore, the formation lining L is such that when the air is admitted to the inside through the action of the pulsator E² and through the receiver A² and vent A¹, the working of the teat cup is greatly improved.

Having now particularly described and ascertained the nature of our said invention and in what manner the same is to be performed we declare that what we claim is:—

1. In improvements in or relating to milking machines, a vessel having a receiver compartment and an ejector compartment, a milk pipe leading into said receiver, a valve on the end of said milk pipe, a valve on the outlet from said receiver to said ejector and a valve on the outlet from said ejector, and means for controlling the alternate admission and withdrawal of air to and from said receiver and said ejector, alternately.

2. In improvements in or relating to milking machines, a vessel having a receiver compartment and an ejector compartment, a milk pipe leading into said receiver, a valve on the end of said milk pipe, a vent in said valve, a valve on the outlet from said receiver to said ejector and a valve on the outlet from said ejector, and means for controlling the alternate admission and withdrawal of air to and from said receiver and said ejector, alternately.

3. In improvements in or relating to milking machines, a pulsator having a port communicating with a vacuum pipe, a port which may be connected with a receiving compartment of a releaser, a port which may be connected with an ejector compartment of a releaser, a passage and port leading from said second mentioned port, means for controlling the passage of air through said passage and port, a slide in said pulsator adapted to close and open either of said ports.

4. In improvements in or relating to milking machines, a vessel having a receiver compartment and an ejector compartment, a milk pipe leading into said receiver, a valve on the end of said milk pipe, a valve on the outlet from said receiver to said ejector, and a valve on the outlet from said ejector, a pulsator having a port communicating with a vacuum pipe, a port communicating with said receiver compartment, a port communicating with said ejector compartment, a passage and port leading from said second mentioned port, means for controlling the passage of air through said passage and port, a slide in said pulsator adapted to close and open either of said ports, and pipes for forming communication between said ports and said compartments.

5. In improvements in milking machines, a passage having a receiver compartment and an ejector compartment, a milk pipe leading into said receiver, a valve on the end of said milk pipe, a valve on the outlet from said receiver to said ejector, a valve on the outlet from said ejector, a pulsator having a port communicating with a vacuum pipe, a port communicating with said receiver compartment, a port communicating with said ejector compartment, a passage and port leading from said second mentioned port, means for controlling the passage of air through said passage and port, a slide in said pulsator adapted to close and open either of said ports, pipes for forming communication between said ports and said compartments, a teat cup, and a lining for said cup of uniform thickness having a number of indentations therein deeper and wider at the top and tapering to a point at the bottom.

6. In improvements in milking machines, a passage having a receiver compartment and an ejector compartment, a milk pipe leading into said receiver, a valve on the end of said milk pipe, a valve on the outlet from said receiver to said ejector, a valve on the outlet from said ejector, a pulsator having a port communicating with a vacuum pipe, a port communicating with said receiver compartment, a port communicating with said ejector compartment, a passage and port leading from said second mentioned port, means for controlling the passage of air through said passage and port, a slide in said pulsator adapted to close and open either of said ports, pipes for forming communication between said ports and said compartments, a teat cup and a lining for said cup of uniform thickness having a number of substantially semispherical indentations therein.

7. In improvements in or relating to milking machines, a vessel having a receiver compartment and an ejector compartment, a milk pipe leading into said receiver, a valve on the end of said milk pipe, a valve on the outlet from said receiver to said ejector, and a valve on the outlet from said ejector, a pulsator having a port communicating with a vacuum pipe, a port communicating with said receiver compartment, a port communicating with said ejector compartment, a passage and port leading from said second mentioned port, means for controlling the passage of air through said passage and port, a slide in said pulsator adapted to close and open either of said ports, and pipes for forming communication between said ports and said compartments, a teat cup, a lining or inflator for said teat cup having a number of indentations therein.

In testimony whereof we affix our signatures in the presence of two witnesses.

WILLIAM FREDERICK TURK.
SIMON NIELSEN.

Witnesses:
ALEXANDER ANDERSON,
ELIZABETH AITCHISON.